(12) United States Patent
King et al.

(10) Patent No.: US 7,055,895 B1
(45) Date of Patent: Jun. 6, 2006

(54) PROTECTIVE PLATE ASSEMBLY FOR LAND VEHICLE DRIVE LINE AND WHEEL DIFFERENTIAL

(76) Inventors: John King, 3113 University Ave., Bakersfield, CA (US) 93306; Robert Wiltshire, P.O. Box 54, Kernville, CA (US) 93238

( * ) Notice: Subject to any disclaimer, the term of this patent is extended or adjusted under 35 U.S.C. 154(b) by 173 days.

(21) Appl. No.: 10/862,085

(22) Filed: Jun. 4, 2004

(51) Int. Cl.
B62D 27/02 (2006.01)

(52) U.S. Cl. ............... 296/204; 296/180.1; 296/38; 280/770

(58) Field of Classification Search ............... 280/770; 180/291; 296/204, 180.1, 38
See application file for complete search history.

(56) References Cited

U.S. PATENT DOCUMENTS

| | | | | |
|---|---|---|---|---|
| 2,160,271 A | * | 5/1939 | Kliesrath | ............ 180/256 |
| 2,883,232 A | * | 4/1959 | Olley et al. | ............ 296/204 |
| 3,454,124 A | * | 7/1969 | Niedek | ............ 180/69.1 |
| 3,754,615 A | | 8/1973 | McIndoo | |
| 3,779,330 A | | 12/1973 | Longpre | |
| 3,826,327 A | | 7/1974 | Stover | |
| 4,310,200 A | | 1/1982 | Olender | |
| 4,402,545 A | * | 9/1983 | Utsunomiya et al. | ....... 296/204 |
| 4,407,381 A | | 10/1983 | Oswald | |
| 4,655,307 A | * | 4/1987 | Lamoureux | ............ 180/69.1 |
| 4,671,370 A | * | 6/1987 | Krude | ............ 180/348 |
| 4,848,835 A | * | 7/1989 | DeRees | ............ 296/204 |
| 5,174,628 A | | 12/1992 | Hayatsugu | |
| 5,322,340 A | * | 6/1994 | Sato et al. | ............ 296/180.1 |
| 5,526,900 A | | 6/1996 | Mason | |
| 5,839,531 A | * | 11/1998 | McGee | ............ 180/69.1 |
| 5,992,926 A | * | 11/1999 | Christofaro et al. | ....... 296/204 |
| 6,161,867 A | | 12/2000 | Tamura | |
| 6,202,778 B1 | | 3/2001 | Mistry | |
| D447,094 S | * | 8/2001 | Conte | ............ D12/114 |
| 6,435,298 B1 | * | 8/2002 | Mizuno et al. | ............ 180/346 |
| 6,516,907 B1 | | 2/2003 | Robinson | |
| 6,726,273 B1 | * | 4/2004 | Kruschhausen et al. | .... 296/204 |

* cited by examiner

Primary Examiner—Christopher P. Ellis
Assistant Examiner—Cynthia F. Collado
(74) Attorney, Agent, or Firm—Dennis W. Beech

(57) ABSTRACT

The protective plate assembly may protect a wheel differential and drive line of a land vehicle from damage and from causing damage. A wheel differential plate may have two axle mount members extending upwardly therefrom and a plate mounting bracket may be attached at an upper end of the axle mount members that may be attachable to an axle housing. A drive line assembly may be attached to the wheel differential plate wherein the drive line assembly may have a bottom plate and two side walls extending upwardly therefrom. A rod may be attached to a front end of the drive line assembly wherein the rod may be positioned to slidably engage a rod mounting bracket that may have an aperture therein and the rod mounting bracket may be attachable to a land vehicle structure to retain the drive line assembly to partially enclose a drive line.

15 Claims, 2 Drawing Sheets

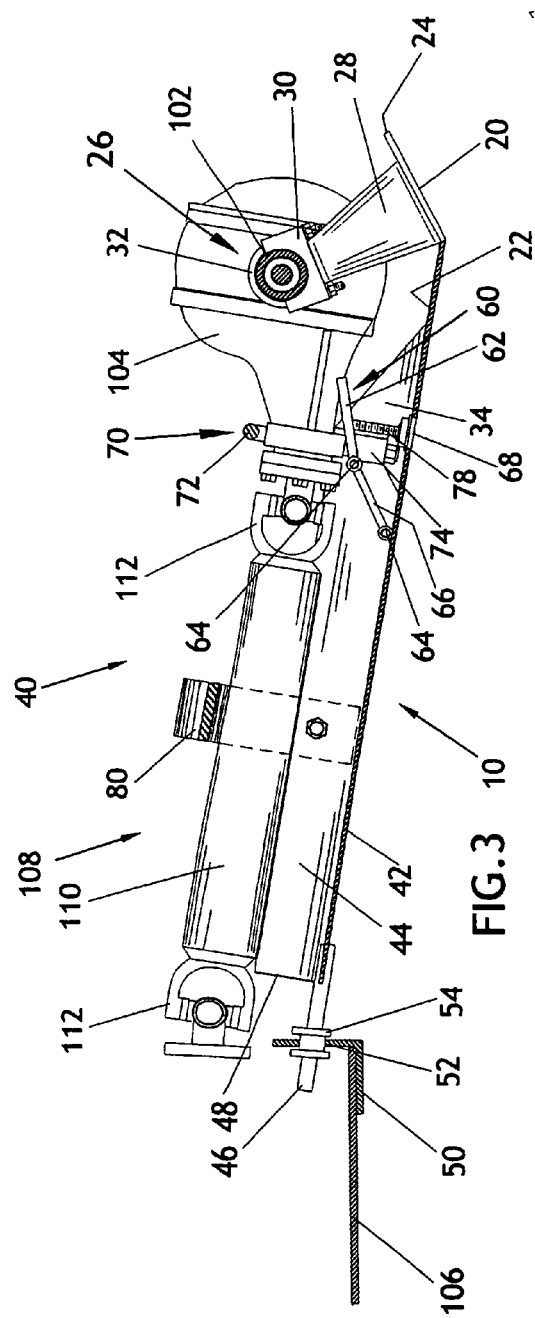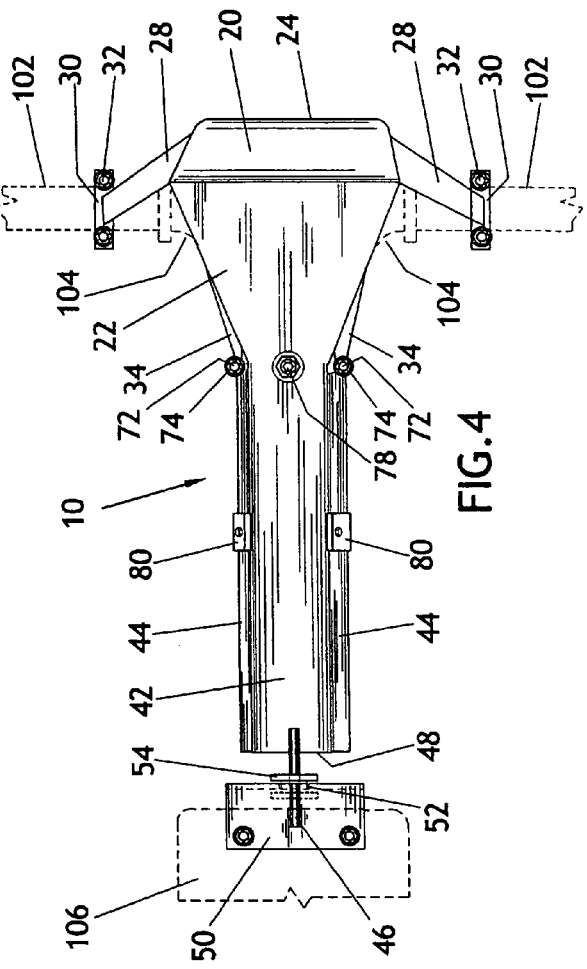

PROTECTIVE PLATE ASSEMBLY FOR LAND VEHICLE DRIVE LINE AND WHEEL DIFFERENTIAL

BACKGROUND OF THE INVENTION

This invention relates to devices that may be mounted on the underside of land vehicles to provide protection for the vehicle drive line and wheel differential from road obstacles in case of contact or other impact to reduce damage that might result. The new protective plate assembly may be mounted below the wheel differential and partially enclose the drive line for impact protection as well as restraining the drive line should it break in some manner.

Skid plates and engine and transmission protective plates may have been used to protect the underside of land vehicles. These devices may be located and attached to various elements of the frame of a vehicle. This structural attachment method attempts to transmit impact force to the vehicle frame. Protective plates that may attach to a vehicle axle housing and a second attachment location that may allow relative motion of parts of the vehicle relative to the protective plate assembly that may also partially enclose the drive shaft may not be known in the art.

SUMMARY OF THE INVENTION

The present invention is directed to devices for protection of a wheel differential and drive line of a land vehicle from damage and from causing damage. A wheel differential plate may have two axle mount members extending upwardly therefrom and a plate mounting bracket may be attached at an upper end of the axle mount members that may be attachable to an axle housing. A drive line assembly may be attached to the wheel differential plate wherein the drive line assembly may have a bottom plate and two side walls extending upwardly therefrom. A rod may be attached to a front end of the drive line assembly wherein the rod may be positioned to slidably engage a rod mounting bracket that may have an aperture therein and the rod mounting bracket may be attachable to a land vehicle structure to retain the drive line assembly to partially enclose a drive line.

These and other features, aspects and advantages of the present invention will become better understood with reference to the following drawings, description and claims.

BRIEF DESCRIPTION OF THE DRAWINGS

FIG. 3 illustrates a side elevation view of a protective plate assembly according to an embodiment of the invention;

FIG. 4 illustrates a bottom view of the protective plate assembly according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
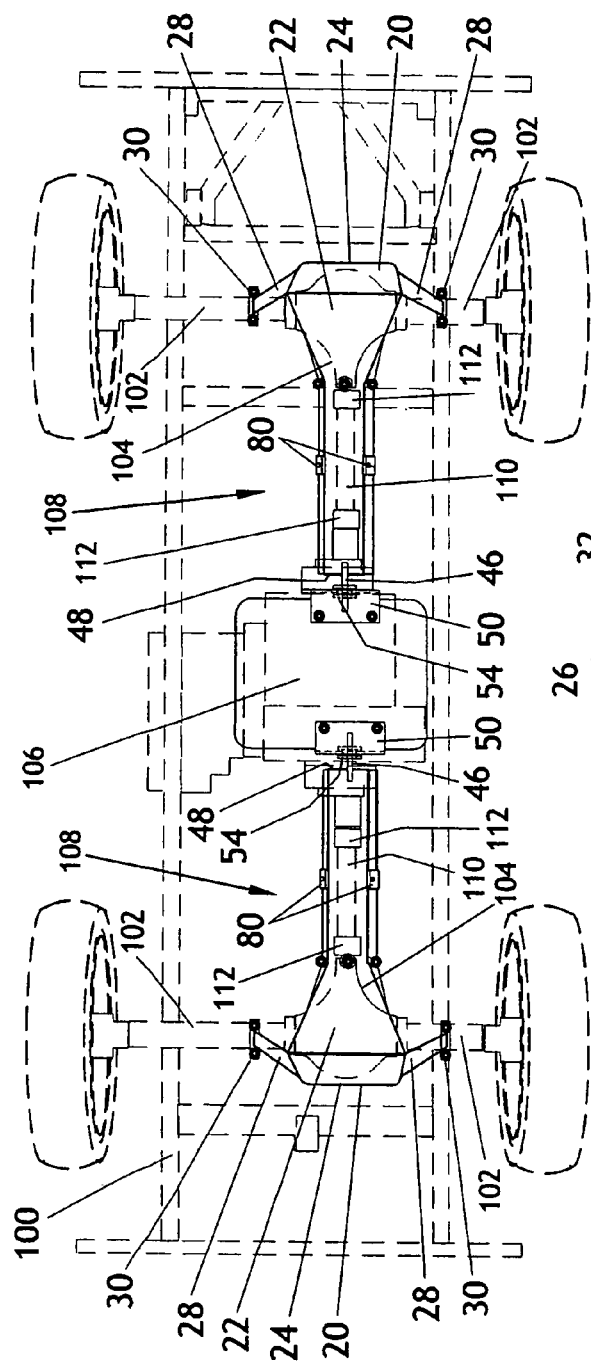
FIG. 1 illustrates a perspective view of two protective plate assemblies mounted under a land vehicle according to an embodiment of the invention.

Referring to FIG. 1, the protective plate assembly 10 may be mounted on the underside of a land vehicle 100, such as, a two or four wheel drive vehicle. FIG. 1 illustrates the use of a protective plate assembly 10 for a rear wheel differential and drive line and a second protective plate assembly 10 for the front. The protective plate assembly 10 may be attached to the axle housing 102 using an axle mount 26, to the wheel differential casing 104 using a U-bolt assembly 70 and a drive line mounting bracket 60, and to the transmission skid plate 106 or other vehicle 100 structural element using a rod mounting bracket 50.

Figure 2:
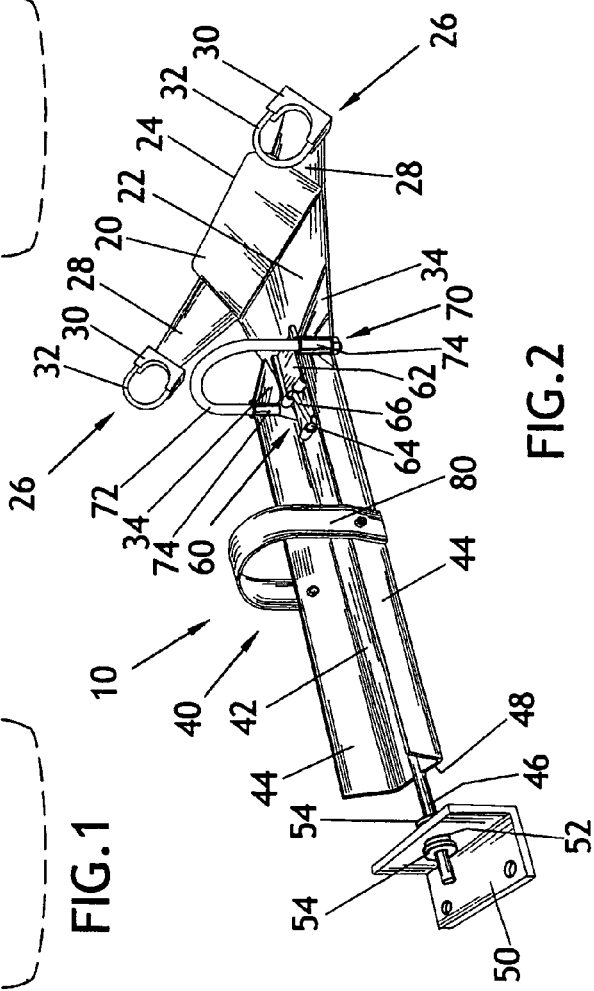
FIG. 2 illustrates a perspective view of a protective plate assembly according to an embodiment of the invention.

Referring to FIGS. 1 and 2, the protective plate assembly 10 may be described relative to the assembly being mounted on the underside, rear of a vehicle 100 wherein reference to front or forward and rear may be relative to the orientation on the vehicle 100. If a protective plate assembly 10 were mounted on the underside, front of a vehicle 100, such references may be reversed when describing the various elements of the invention.

The protective plate assembly 10 may have a wheel differential plate 20 attached to a drive line assembly 40. The wheel differential plate 20 may have a forward portion 22 and a rear portion 24 that may be sloped upwardly one to the other for positioning under the wheel differential casing 104. There may be two axle mounts 26 attached to the wheel differential plate 20 with each having an axle mount member 28 extending upwardly therefrom and each axle mount member 28 oriented for use in attachment to a rear axle housing of the vehicle 100. There may be a plate mounting bracket 30 attached to the upper end of each axle mount member 28 that may receive a U-bolt 32 for securing to the rear axle housing.

The drive line assembly 40 may have a bottom plate 42 that may be approximately horizontal oriented when in use on a vehicle 100 and may have two side walls 44 extending upwardly from the bottom plate 42 to form a trough. The bottom plate 42 may also have an upward slope when in use depending on the particular vehicle 100 mounting requirements. The side walls 44 may also be sloped relative to the bottom plate 42, for example outwardly relative to the interior depending on the drive line of a vehicle 100. The wheel differential plate 20 may have support side walls 34 that may be attached to side walls 44. The support side walls 34 may also be tapered in a downwardly, rearwardly direction to accommodate attachment of the wheel differential plate 20.

There may be a rod 46 attached to the front end 48 of the drive line assembly 40 for use in attachment to a structural member of the vehicle 100, such as, the transmission skid plate 106. A rod mounting bracket 50 may be attached to the transmission skid plate 106 and be oriented to locate an aperture 52 in position for slidable insertion of the rod 46 therethrough. The aperture 52 may have a bushing 54 therein that may be flexible and resilient to allow motion of the rod 46 when inserted in the aperture 52 and bushing 54. This may provide for limited flexible motion between the protective plate assembly 10 and the vehicle 100 front mount location and may reduce noise caused by such motion.

Referring to FIGS. 2 through 4, the protective plate assembly 10 may have a drive line mounting bracket 60 and a U-bolt assembly 70 for attachment to the wheel differential casing 104 at a front portion thereof. The drive line mounting bracket 60 and U-bolt assembly 70 may be located on the protective plate assembly in a position best suited for attachment to the particular wheel differential casing 104 that in the drawing for illustrative purposes is at the approximate juncture of the wheel differential plate 20 and drive line assembly 40.

The drive line mounting bracket 60 may have a support plate 62 that may have a hinge 64 rotationally attached at one end to the support plate 62 and at the opposite end rotationally attached to the bottom plate 42. There may be a hinge rod 66 defining the separation between the support plate 62 and bottom plate 42. There may be a threaded mounting aperture 68 formed in bottom plate 42 or wheel differential plate 20 depending on the location of the drive line mounting bracket 60. An adjustment bolt 78 may be threaded in the mounting aperture 68 to raise and lower the position of the support plate 62.

There may be a U-bolt assembly 70 cooperatively located with the drive line mounting bracket 60 wherein a U-bolt 72 may be insert into two sleeves 74. When the protective plate assembly 10 may be installed on a vehicle the U-bolt 72 may be placed around the wheel differential casing 104 at a front portion and the ends secured by bolts 76. The support plate 62 may be positioned against the bottom of the wheel differential casing 104 using the adjustment bolt 78 wherein the hinge 64 may allow freedom of movement of the support plate 62 to press firmly against the wheel differential casing 104 at a front portion thereof depending on the shape of the casing.

The protective plate assembly 10 may be formed using steel plate with attachments of various elements fixed by welding. Other construction such as composite materials as well as other attachment methods may be used that may provide protection from road obstacles in case of contact or other impact to reduce damage that might result.

There may be a retainer band 80 attached to the drive line assembly 40. The attachment may be on side walls 44 and bolts may be used for the attachment. The retainer band 80 may be attached after the protective plate assembly 10 may be attached to the vehicle and the drive line of the vehicle is disposed interior to the drive line assembly 40. The retainer band 80 may serve to retain the drive line 108 elements, such as, a drive shaft 110 to prevent damage to a vehicle floor or undercarriage in the event of a broken U-joint 112 or other such damage to the drive line 108.

The attachment of the protective plate assembly 10 as previously described may also aid in reducing the amount of spring wrap that may occur in vehicles when the drive wheels may experience high torque.

While the invention has been particularly shown and described with respect to the illustrated embodiments thereof, it will be understood by those skilled in the art that the foregoing and other changes in form and details may be made therein without departing from the spirit and scope of the invention.

We claim:

1. A device to protect a wheel differential and drive line of a land vehicle from damage and from causing damage comprising:
   a wheel differential plate having two axle mount members extending upwardly therefrom and a plate mounting bracket attached at an upper end of said axle mount members attachable to an axle housing;
   a drive line assembly attached to said wheel differential plate wherein said drive line assembly having a bottom plate and two side walls extending upwardly therefrom; and
   a rod attached to a front end of said drive line assembly wherein said rod positioned to slidably engage a rod mounting bracket having an aperture therein and said rod mounting bracket attachable to a land vehicle structure to retain said drive line assembly to partially enclose a drive line.

2. The device as in claim 1 wherein a support plate attached by a hinge to said bottom plate in a position to be engagable with a wheel differential casing and two sleeves attached to said side walls for receipt of a U-bolt engagable with said wheel differential casing.

3. The device as in claim 2 wherein said hinge having a hinge rod.

4. The device as in claim 2 wherein said wheel differential plate having a threaded aperture therein with an adjustment bolt threaded in said threaded aperture positioned to move said support plate in a generally vertical direction.

5. The device as in claim 2 wherein said bottom plate having a threaded aperture therein with an adjustment bolt threaded in said threaded aperture positioned to move said support plate in a generally vertical direction.

6. The device as in claim 1 wherein said aperture having a bushing disposed therein.

7. The device as in claim 1 wherein said wheel differential plate having a forward portion and a rear portion sloped upwardly one relative to the other.

8. The device as in claim 1 wherein said plate mounting bracket having a U-bolt for attachment to said axle housing.

9. The device as in claim 1 wherein said wheel differential plate having two support side walls attached to said side walls and said support side walls taper downwardly in a rearwardly direction.

10. A device to protect a wheel differential and drive line of a land vehicle from damage and from causing damage comprising:
    a wheel differential plate having two axle mount members extending upwardly therefrom and a plate mounting bracket attached at an upper end of said axle mount members attachable to an axle housing;
    a drive line assembly attached to said wheel differential plate wherein said drive line assembly having a bottom plate and two side walls extending upwardly therefrom wherein said side walls attached to two support side walls extending upwardly from said wheel differential plate;
    a rod attached to a front end of said drive line assembly wherein said rod positioned to slidably engage a rod mounting bracket having an aperture therein and said rod mounting bracket attachable to a land vehicle structure to retain said drive line assembly to partially enclose a drive line;
    a support plate attached by a hinge to said bottom plate in a position to be engagable with a wheel differential casing and two sleeves attached to said side walls for receipt of a U-bolt engagable with said wheel differential casing; and
    said wheel differential plate having a threaded aperture therein with an adjustment bolt threaded in said threaded aperture positioned to move said support plate up and down relative to said wheel differential plate and said bottom plate.

11. The device as in claim 10 wherein said hinge having a hinge rod.

12. The device as in claim 10 wherein said aperture having a bushing therein.

13. The device as in claim 10 wherein said wheel differential plate having a forward portion and a rear potion sloped upwardly one relative to the other.

14. The device as in claim 10 wherein said plate mounting bracket having a U-bolt for attachment to said axle housing.

15. The device as in claim 10 wherein said support side walls taper downwardly in a rearwardly direction.

* * * * *